United States Patent
Downing et al.

(10) Patent No.: US 10,782,459 B2
(45) Date of Patent: Sep. 22, 2020

(54) FILTER ARRAY WITH REDUCED STRAY LIGHT

(71) Applicants: Kevin R. Downing, Westford, MA (US); Ian S. Tribick, Groton, MA (US)

(72) Inventors: Kevin R. Downing, Westford, MA (US); Ian S. Tribick, Groton, MA (US)

(73) Assignee: MATERION CORPORATION, Mayfield Heights, OH (US)

(*) Notice: Subject to any disclaimer, the term of this patent is extended or adjusted under 35 U.S.C. 154(b) by 311 days.

(21) Appl. No.: 14/250,553

(22) Filed: Apr. 11, 2014

(65) Prior Publication Data

US 2014/0307309 A1    Oct. 16, 2014

Related U.S. Application Data

(60) Provisional application No. 61/812,397, filed on Apr. 16, 2013.

(51) Int. Cl.
*G02B 5/28* (2006.01)
*G02B 5/20* (2006.01)
(Continued)

(52) U.S. Cl.
CPC .............. *G02B 5/285* (2013.01); *G02B 5/201* (2013.01); *G02B 5/281* (2013.01); *G02B 5/283* (2013.01);
(Continued)

(58) Field of Classification Search
CPC ........ G02B 5/003; G02B 5/201; G02B 5/208; G02B 5/22; G02B 5/28–289;
(Continued)

(56) References Cited

U.S. PATENT DOCUMENTS 2,708,389 A * 5/1955 Kavanagh ................ G01J 3/12
                                                    250/226
5,096,520 A * 3/1992 Faris .................... G02B 27/283
                                                    156/99
(Continued)

FOREIGN PATENT DOCUMENTS

JP      H08-21748         1/1996
JP    2014095843 A *      5/2014     ........... G02B 6/4215

OTHER PUBLICATIONS

International Search Report and Written Opinion for PCT/US2014/033784.
(Continued)

*Primary Examiner* — Kimberly N. Kakalec
(74) *Attorney, Agent, or Firm* — Tucker Ellis LLP

(57) ABSTRACT

Optical filter elements each include a parallelogram-shaped substrate with parallel light entrance and light exit surfaces and parallel slanted sidewalls slanted at an angle, and an interference filter disposed on one or both of the light entrance surface and the light exit surface. The optical filter elements are bonded together at the slanted sidewalls to form the optical filter array. Light is filtered by illuminating the optical filter array at an angle θ equal to or corresponding to the angle of the slanted sidewalls. In some embodiments the angle of the slanted sidewalls corresponds to the angle-of-incidence θ by Snell's law.

19 Claims, 4 Drawing Sheets

(51) Int. Cl.
   *G02B 27/00* (2006.01)
   *G02B 27/28* (2006.01)
(52) U.S. Cl.
   CPC ......... *G02B 27/0018* (2013.01); *G02B 27/28* (2013.01); *G02B 2207/123* (2013.01); *Y10T 156/1062* (2015.01)
(58) Field of Classification Search
   CPC .............. G02B 7/006; G02B 26/001; G02B 27/1006–1013; G02B 27/1073; G02B 27/14–143; G02B 27/145; G01J 3/12; G01J 3/28–2823; G01J 2003/1213–123; G01J 2003/1239; G01J 2003/1278; G01J 2003/2806–282; G01J 2003/2826; H01L 27/1462–14623; H01L 27/1463; H01L 27/14685; H01L 31/02162–02165
   USPC ............ 359/260, 261, 359/360, 577–580, 359/584–590, 601, 613, 614, 618, 629, 359/634, 885, 888, 891, 892; 356/51, 356/300, 319, 320, 326, 454, 519, 416, 356/419
   See application file for complete search history.

(56) References Cited

U.S. PATENT DOCUMENTS

| | | |
|---|---|---|
| 5,784,507 A | 7/1998 | Holm-Kennedy et al. |
| 6,212,312 B1 | 4/2001 | Grann et al. |
| 6,394,607 B1 * | 5/2002 | Hashizume .......... G02B 5/3025 348/E5.141 |
| 7,433,042 B1 | 10/2008 | Cavanaugh et al. |
| 2002/0109821 A1 | 8/2002 | Huibers et al. |
| 2004/0178329 A1 | 9/2004 | Kare et al. |
| 2006/0198576 A1 * | 9/2006 | Furusawa .......... G02B 6/29367 385/24 |
| 2007/0211339 A1 | 9/2007 | Furusato |
| 2008/0089068 A1 | 4/2008 | Mimura et al. |
| 2012/0147228 A1 | 6/2012 | Duparre et al. |
| 2014/0133862 A1 * | 5/2014 | Fujimura ............. G02B 6/4215 398/79 |

OTHER PUBLICATIONS

Extended European Search Report for European Patent Application No. 14785110.9, dated Nov. 9, 2016.
Summons to Attend Oral Proceedings for European Patent Application No. 14785110.9, dated Jan. 4, 2019.

* cited by examiner

FILTER ARRAY WITH REDUCED STRAY LIGHT

This application claims the benefit of U.S. Provisional Application No. 61/812,397 filed Apr. 16, 2013 and titled "FILTER ARRAY WITH REDUCED STRAY LIGHT". U.S. Provisional Application No. 61/812,397 filed Apr. 16, 2013 is incorporated herein by reference in its entirety

BACKGROUND

The following relates to the optical arts, optical filter arts, spectrographic arts, pricing information distribution arts, and related arts.

Optical filters with high spectral selectivity can be manufactured using a stack of layers with alternating layers of two (or more) constituent materials having different refractive index values. Such filters are sometimes called interference filters, and can be designed to provide a designed pass-band, stop-band, high-pass, or low-pass output. For pass-band filters, the width of the pass-band can typically be made as narrow as desired by using more layer periods in the stack, albeit possibly with some transmission loss at the peak transmission wavelength. A notch filter can be similarly designed by constructing the stack of layers to form a Bragg reflector blocking the stop-band. The layer stack is deposited on a substrate that is optically transmissive for the wavelength or wavelength range to be transmitted, and may for example be a glass plate for an optical filter operating in the visible spectrum. This results in a filter plate whose structural rigidity is provided by the substrate.

In such optical filters, a given filter plate operates at a single well-defined pass-band or stop-band. The layers of the stack are typically required to have precise thicknesses to meet the specified wavelength and bandwidth for the pass-band or stop-band.

However, it is difficult or impossible to vary the layer thicknesses across the substrate plate during layer deposition or by post-deposition processing in a controlled manner in order to provide different pass-bands or stop-bands in different areas of the plate. Such an arrangement is useful for a spectrometer, spectrum analyzer, or other "multi-spectral" applications.

Filter arrays address this problem by fabricating a set of filter plates with different filter characteristics (e.g. different pass-band or stop-band wavelength and/or bandwidth). The filter plates are then diced to form filter elements in the form of strips. These strips are then bonded together in a desired pattern to form the filter array. The resulting filter array is sometimes referred to as a "butcher block" due to its similarity in bonding structural elements (filter elements here, c.f. wood elements in the case of an actual butcher block). This approach decouples the optical characteristics of each filter element of the filter array from those of the other filter elements, enabling substantially any combination of filter elements in a single filter array.

Some improvements are disclosed herein.

BRIEF DESCRIPTION

In some illustrative embodiments, an optical filter array comprises optical filter elements each including a parallelogram-shaped substrate with parallel light entrance and light exit surfaces and parallel slanted sidewalls slanted at an angle, and an interference filter disposed on one or both of the light entrance surface and the light exit surface. The optical filter elements are bonded together at the slanted sidewalls to form the optical filter array. Some embodiments further include an entrance aperture having openings aligned with the light entrance surfaces of the optical filter elements, and an exit aperture having openings aligned with the light exit surfaces of the optical filter elements, wherein the exit aperture openings are laterally shifted relative to the entrance aperture openings to accommodate the slanted sidewalls of the optical filter elements. In some embodiments the slanted sidewalls are slanted at an angle of at least 5°. In some embodiments the slanted sidewalls are slanted at an angle of at least 9°. The optical filter elements may comprise a plurality of optical filter elements of different optical filter types defined by different interference filters. the interference filters of the optical filter elements may comprise pass-band filters or notch filters operating in (in various embodiments) the visible spectrum, the ultraviolet spectrum, and/or the infrared spectrum.

In some illustrative embodiments, a method comprises providing an optical filter array as set forth in the immediately preceding paragraph, and illuminating the optical filter array with light at an angle-of-incidence θ equal to the angle of the slanted sidewalls, or illuminating the optical filter array with light at an angle-of-incidence $\theta = n_{sub} \theta_{sub}$ where $n_{sub}$ is the refractive index of the parallelogram-shaped substrates and $\theta_{sub}$ is the angle of the slanted sidewalls.

In some illustrative embodiments, a method comprises fabricating a plurality of optical filter plates of different optical filter types, dicing the optical filter plates to form optical filter elements with sidewalls that are slanted, and bonding the optical filter elements together at the slanted sidewalls to form an optical filter array. The method may further comprise filtering light by illuminating the optical filter array with the light illuminating the optical filter array at an angle equal to or corresponding to the angle of the slanted sidewalls.

In some illustrative embodiments, an optical filter array includes a plurality of optical filter elements of different optical filter types, each optical filter element having a light entrance surface and a light exit surface connected by slanted sidewalls. The optical filter elements are bonded together at the slanted sidewalls to form the optical filter array with the light entrance surfaces of the optical filter elements forming a light entrance side of the optical filter array and the light exit surfaces of the optical filter elements forming a light exit side of the optical filter array. In some embodiments the optical filter elements comprise pass-band filters or notch filters. In some embodiments, the optical filter array further includes outermost optical filter elements, each outermost optical filter element having a light entrance surface and a light exit surface connected by a slanted sidewall and by a straight sidewall, and the outermost optical filter elements are bonded via the slanted sidewalls of the outermost optical filter elements to ends of the optical filter array with the straight sidewalls of the outermost optical filter elements defining straight outermost sidewalls of the optical filter array.

DETAILED DESCRIPTION

A disadvantage of filter arrays recognized herein is the possibility of edge effects at the boundaries between adjacent bonded filter elements. This can be reduced by using optically absorbing adhesive, surface roughening, or other control of the interfaces between filter elements so as to avoid stray light leakage at these boundaries.

However, in some applications the filter array is illuminated at an angle. It is recognized herein that these techniques can be ineffective in this case, because stray light can be generated by total internal reflection (TIR) at the substrate surface and/or by reflection or scattering from the adhesive or other bond.

Another difficulty recognized herein with angled illumination of a filter array is that the size of the filter elements is increased. This is due to the need to accommodate the shift in light at the exit aperture compared with the entrance aperture due to the angle of light. If the angle of light traveling through the optical filter element is $\theta_{sub}$ and the thickness of the filter element between the entrance and exit apertures is d, then the increase at the exit aperture as compared with the entrance aperture is of order $d \tan \theta_{sub}$. In some typical applications $\theta$ (in air) is on the order of 15°, corresponding to an angle in the optical filter element of about 10° (assuming a refractive index of 1.5 in the substrate of the optical filter element) so that the angled illumination increases the lateral area by about 18% of the thickness d of the filter elements. This effect can be countered by using thinner substrates for the filter plates (i.e., smaller d), but at the cost of reduced structural rigidity and potentially reduced yield during fabrication and dicing of the filter plates and subsequent assembly of the filter array from the diced filter elements.

Figure 1:
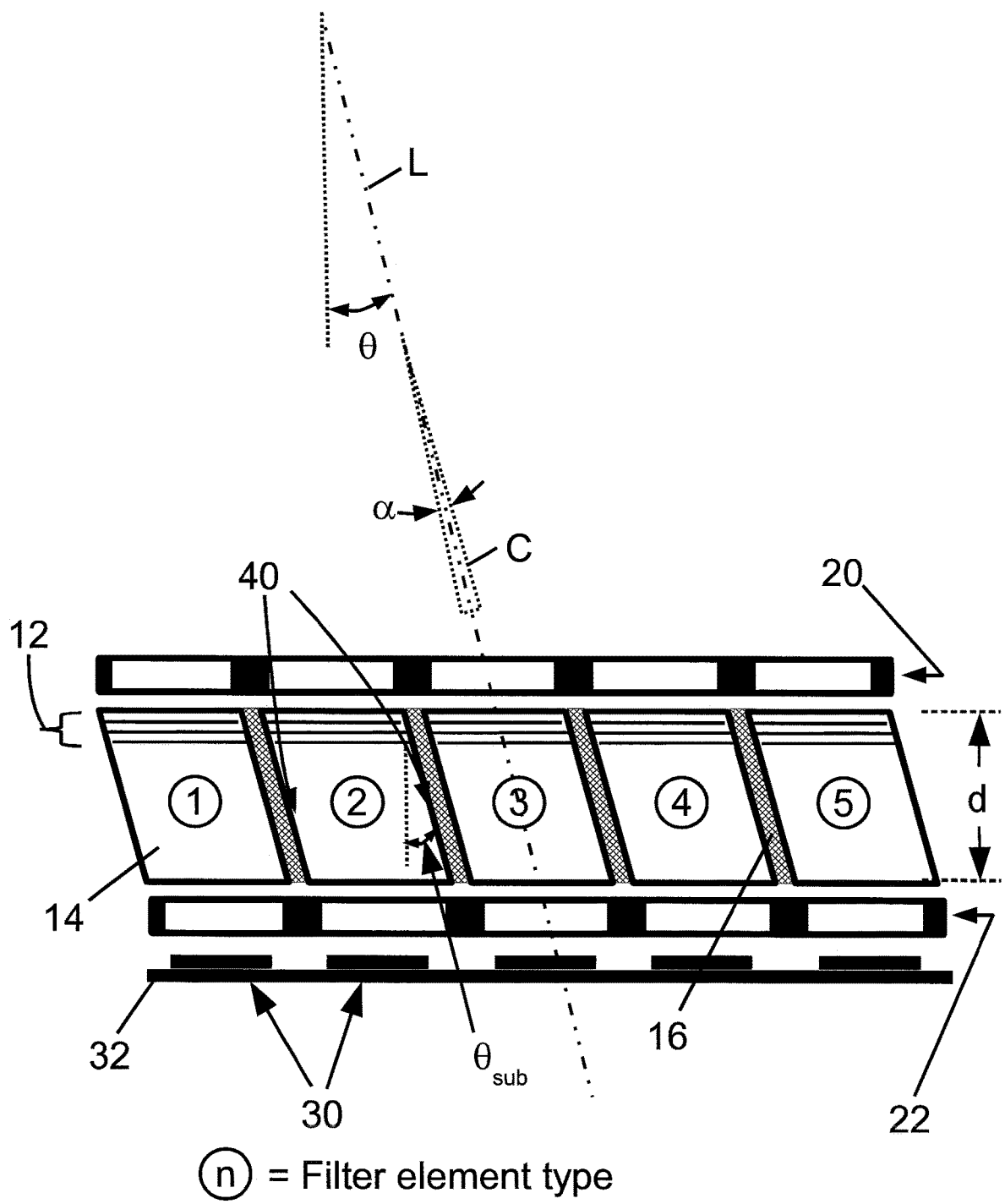
FIG. 1 diagrammatically shows a filter array in side-sectional view.

With reference to FIG. 1, an improved filter array is shown in side-sectional view. In this diagrammatic illustrative example, a filter array includes five filter elements of five different types labeled "1" to "5". (This is merely illustrative—in general the filter array may have dozens or hundreds of filter elements). Each filter element is diced from a filter plate on which a filter layers stack was deposited having a different optical characteristic (e.g., different pass band or stop band, in terms of center wavelength and/or bandwidth). As shown in FIG. 1, each filter element thus includes a filter layers stack 12 supported by a filter element substrate 14. Typically, the filter element(s) of each filter type is (are) diced from a single filter plate. The filter elements may, in general, be designed for any pass band or stop band in the ultraviolet, visible, or infrared wavelength range. By way of illustrative example, a filter element operating in the visible range may include a filter element substrate 14 of glass, sapphire, or another material having suitable transparency in the optical range, and the filter stack 12 may include alternating layers of tantalum oxide ($Ta_2O_5$) and silicon dioxide ($SiO_2$), or more generally alternating layers of two (or more) materials with different refractive index values. By way of another illustrative example, the layers may be metal/metal oxide layers such as titanium/titanium dioxide ($Ti/TiO_2$). Known techniques for designing interference filter optical stacks can be employed to design the layer thicknesses for a given pass-band or notch filter stop-band, or to provide desired high-pass or low-pass filtering characteristics. The diced filter elements are bonded together using an adhesive or other bond 16.

With continuing reference to FIG. 1, the illustrative filter array is designed to be illuminated by light L at an incident angle $\theta$ as shown. Although the light L is predominantly at the incident angle $\theta$, the light is not necessarily precisely collimated, and light rays with angles other than $\theta$ may be present, as diagrammatically indicated in FIG. 1 by an incident angle variation cone C having cone angle α around the principle direction $\theta$. The cone angle α is typically less than the angle-of-incidence $\theta$, so that the filter array is illuminated at angle-of-incidence $\theta$ but possibly with some spread α. This light impinges on the entrance surface of the filter array, which optionally includes an entrance aperture 20 to reduce optical cross-talk (e.g. block stray light) at the entrance surface of the filter array. The light L passes through the filter layers stack 12 of the filter element and through the filter element substrate 14, and exits from the exit surface of the filter array. An exit aperture 22 is optionally located on the exit side to reduce optical cross-talk (e.g. block stray light) at the exit surface of the filter array. The light output from the exit surface of each filter element is filtered by the filter layers stack 12 of that filter element, and thus includes only the spectral component of the incident light in the pass-band (or only the spectral component outside of the stop-band, in the case of a notch filter; or only the spectral component above the cut-off wavelength in the case of a high-pass filter element; or only the spectral component below the cut-off wavelength in the case of a low-pass filter element; or so forth). While in illustrative FIG. 1 the filter layers stack 12 of each filter element is disposed on the entrance surface of the filter element (or, more precisely, on the entrance surface of the filter element substrate 14), it is alternatively possible to have the filter layers stack disposed on the exit surface, or to have filter layers stacks disposed on both entrance and exit surfaces (either of the same type to provide sharper spectral bandwidth or cutoff, or of different types to provide more complex filter characteristics, e.g. two stop-bands in a two-band notch filter).

The light exiting from the exit surface is detected by light detectors 30, which can in general be any type of light detector suitable for detecting the wavelength(s) of light output by the filter element. In the illustrative example, the light detectors 30 are monolithically fabricated on a common substrate 32; however, discrete light detectors can be employed. In some illustrative embodiments, the light detectors 30 are a linear or two-dimensional array of photodiodes, avalanche photodiodes, an optically sensitive charge coupled device (CCD) array, or so forth. In general, the filter elements provide the spectral selectivity, so that the light detectors 30 can be broad-band detector elements and indeed the same type of detector element can be coupled with the output of each of the filter elements. Although not shown in FIG. 1, the exit aperture is optionally connected with the light detectors to eliminate gaps or spaces that might admit stray light to the light detectors.

With continuing reference to FIG. 1, which shows a side view of the filter array, each filter element is cut with angled sidewalls 40 (labeled for only one filter element of the array). The angled sidewalls 40 are sloped to match the angle $\theta_{sub}$ of the incident light L traveling through the filter element substrate 14. Thus, each filter element has a parallelogram shape in the side sectional view, with flat top and bottom surfaces, and slanted sidewalls 40 at the same angle $\theta_{sub}$. The angle $\theta_{sub}$ in the filter element substrate 14 is related to the angle-of-incidence $\theta$ in air by Snell's law, i.e $\sin(\theta) = n_{sub} \sin(\theta_{sub})$ where $n_{sub}$ is the refractive index of the filter element substrate 14, and the ambient is assumed to be air, vacuum, or another ambient with refractive index n=1. For example, if $\theta = 15°$ and $n_{sub} = 1.5$ then $\theta_{sub} \cong 10°$. (If the ambient is oil or some other material with $n_{ambient}$ different from unity, then Snell's law generalizes to $n_{ambient} \sin(\theta) = n_{sub} \sin(\theta_{sub})$).

In the following, it is assumed that the thickness of the filter layers stack 12 is much less than the thickness of the filter element substrate 14, so that the thickness of the filter element is about equal to the thickness of the filter element substrate 14, denoted d in FIG. 1. Similarly, for calculating the beam path through the filter element, the filter element is assumed to have refractive index $n_{sub}$ of the filter element substrate 14 neglecting the changes in refractive index through the filter layers stack.

As a further approximation, it is contemplated to approximate $\theta_{sub}=\theta$, so that the Snell's law correction is neglected. This approximation is more accurate for smaller values of $n_{sub}$. This approximation may be used to simplify the optical design, or may be used in the case of a filter array having optical filter elements with substrates of different materials with different refractive indexes. In such a case, there is no one angle matching the angle of light travel in all the filter element substrates, and some approximation is suitably employed, such as the aforementioned approximation $\theta_{sub}=\theta$, or an approximation in which $\theta_{sub}$ is set to the average value for the different substrate types.

Reflection or light scattering of the incident light L of angle-of-incidence $\theta$ from the slanted sidewalls 40 slanted at the angle $\theta_{sub}$ is substantially reduced as compared with conventional filter elements having straight sidewalls. The reduced light scattering reduces optical losses and the potential for optical cross-talk. The potential for photoluminescence or phosphorescence due to interaction between the incident light and the adhesive or contaminants at the sidewalls is also substantially reduced.

Another advantage of the disclosed filter elements with slanted sidewalls 40 at angle $\theta_{sub}$ equal to or corresponding to (e.g. via Snell's law) the angle-of-incidence $\theta$ of the incident light L is the ability to employ more filter elements in a filter array of a given size. As seen in diagrammatic FIG. 1, the openings in the entrance aperture 20 and in the exit aperture 22 are of the same size. This is achieved by laterally offsetting the exit aperture 22 relative to the entrance aperture 20 by a distance $d \cdot \tan(\theta_{sub})$ where d is the thickness of the filter element substrates 14 and $\theta_{sub}$ is the angle of the incident light traveling through the filter element substrate. As seen in FIG. 1, the shift $d \cdot \tan(\theta_{sub})$ between the exit aperture 22 and entrance aperture 20 is accommodated by the slanted sidewalls 40 of the filter elements. By contrast, when filter elements with conventional flat sidewalls are employed, the filter elements must be wider in order to accommodate the shift of $d \cdot \tan(\theta_{sub})$ due to the angled light travel through the filter element.

Figure 2:
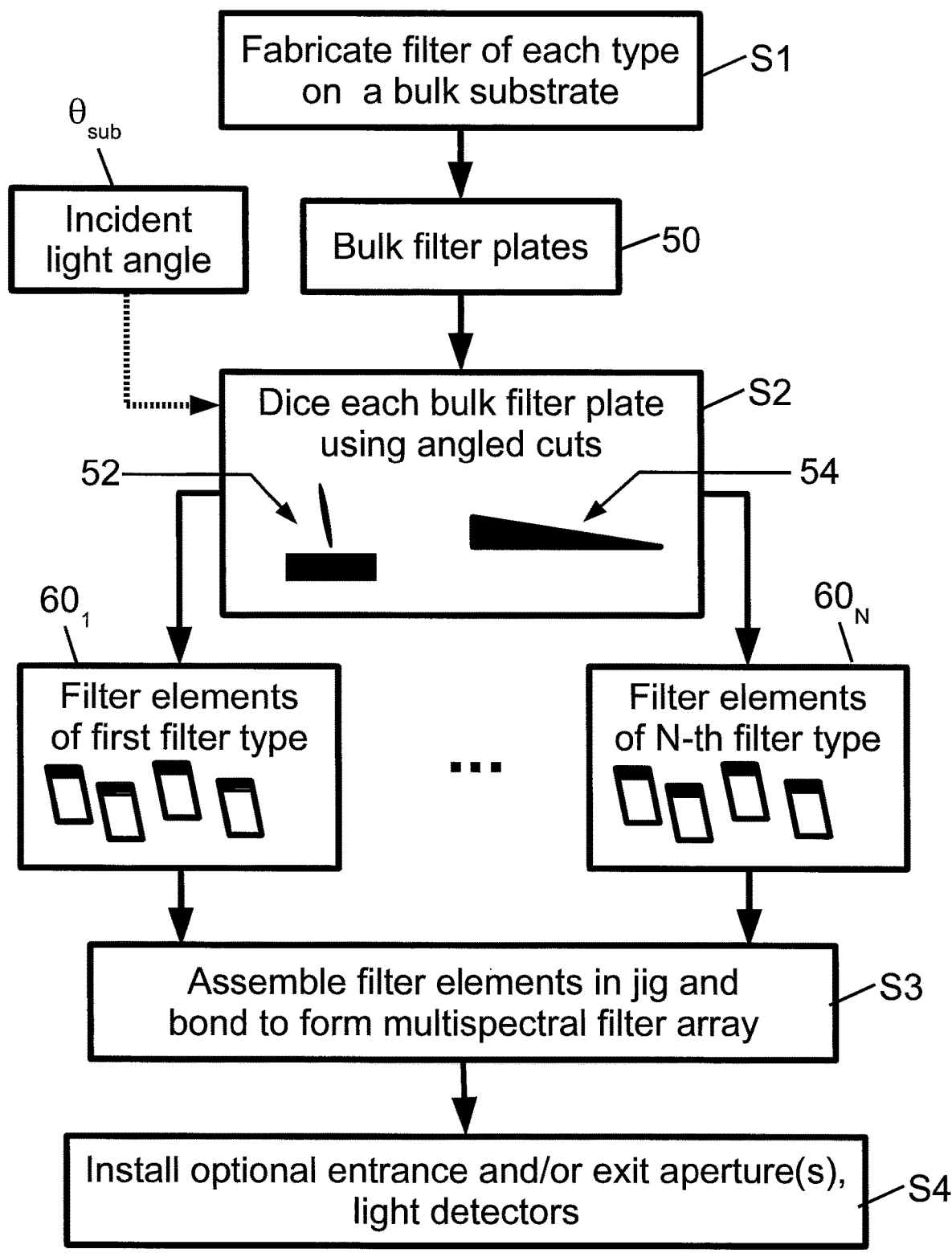
FIG. 2 diagrammatically shows a manufacturing process for manufacturing the filter array of FIG. 1.

With reference to FIG. 2, manufacture of the filter array of FIG. 1 is diagrammatically shown. In an operation S1, a filter plate is fabricated on a bulk substrate for each filter element type 1, . . . , 5. Typically, this entails disposing the substrate (e.g. a glass substrate for some visible-range designs) in a deposition system and depositing the filter layers stack by sputtering, vacuum evaporation, plasma deposition, or another technique, with the thicknesses of the constituent layers of the filter stack of each filter plate designed to provide filter characteristics of the corresponding filter type. The result of this processing is a set of filter plates 50, e.g. five filter plates corresponding to filter element types 1, 2, 3, 4, 5 for fabricating the illustrative filter array of FIG. 1.

In an operation S2, the filter plates 50 are then diced. The angled sidewalls are formed by dicing at angle $\theta_{sub}$. Typically, the angle $\theta$ of light L in the ambient is at least 5°, and more preferably at least 10°, although larger values for the design angle $\theta$ are contemplated, so that the angle $\theta_{sub}$ of the slanted sidewalls is at least 5°, and more preferably at least 9°. The dicing operation S2 can employ an angled-blade saw 52 with the blade set tilted at the angle $\theta_{sub}$, such as a semiconductor wafer dicing saw with an adjustable-angle cutting blade. Alternatively, the dicing can employ a laser dicing rig (not shown) with a tilted cutting laser beam angle.

In another approach, the cutting blade (or cutting laser beam) is kept perpendicular, and the filter plate is mounted on a wedge sub-mount 54 for the dicing operation S2. In this approach the wedge sub-mount 54 has a wedge angle $\theta_{sub}$ so that mounted filter plate is cut with the desired sidewall angle $\theta_{sub}$. The dicing operation S2 produces filter elements $60_1$ of the first type from the first filter plate, filter elements of the second type from the second filter plate, and so on up to filter elements $60_N$ of an Nth type (e.g. N=5 in FIG. 1).

In an operation S3, filter elements of the requisite types are then mounted in a bonding jig and glued together at the slanted sidewalls using adhesive or are otherwise bonded together to form the multispectral filter array. Optionally, in an operation S4 other components such as the entrance and/or exit apertures 20, 22 and the light detectors 30 are added to the filter array to form a complete multispectral optical system.

Figure 3:
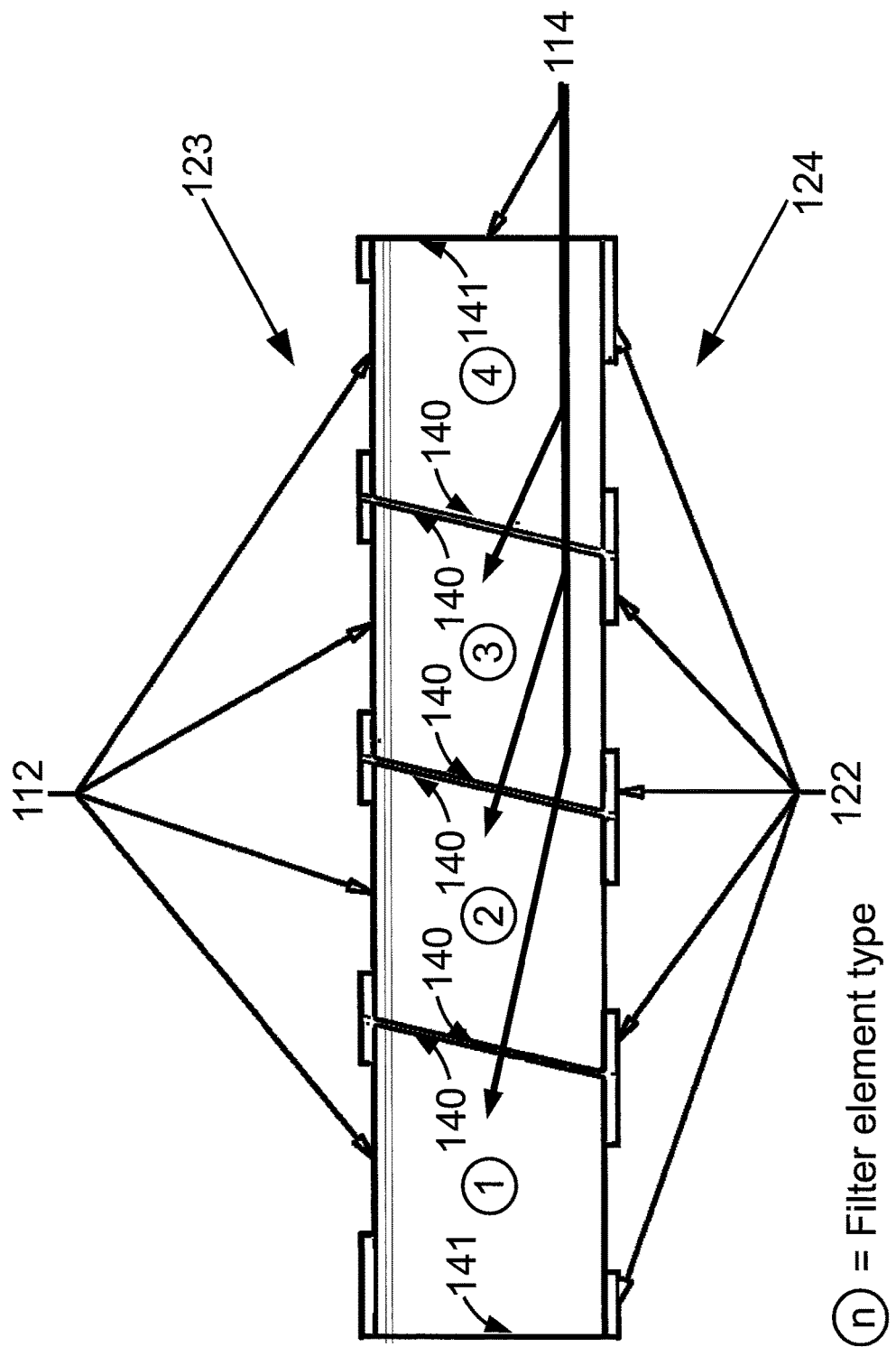
FIGS. 3 and 4 diagrammatically show a side view and a perspective view, respectively, of another illustrative filter array.
Figure 4:
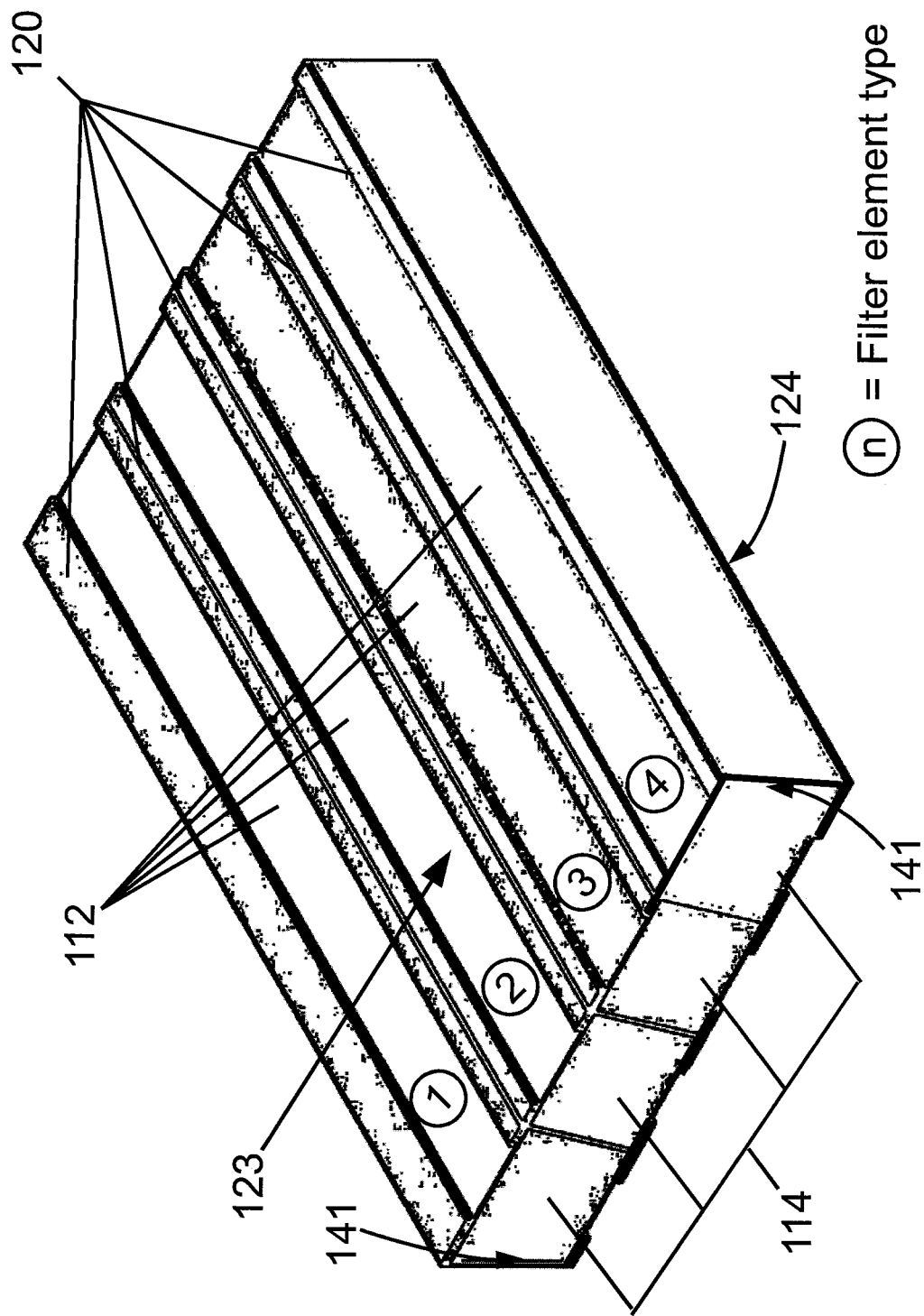

With reference to FIGS. 3 and 4, a side and a perspective view, respectively, of another illustrative embodiment is shown. In FIGS. 3 and 4 the filter element substrates of the different filter element types are again distinguished by labels, here the labels "1" to "4". As in the embodiment of FIG. 1, each filter element includes a filter layers stack 112, for example embodied as optical coatings forming interference filters, disposed on a filter element substrate 114. In this embodiment entrance and exit apertures 120, 122 are formed on the light entrance side 123 and on the light exit side 124, respectively, as patterned dark mirror coatings deposited onto the boundaries between optical filter elements after the filter elements assembly operation. (Note that the entrance apertures 120 are labeled only in FIG. 4, while the exit apertures 122 are labeled only in FIG. 3). As best seen in FIG. 3, this illustrative embodiment also employs smaller exit aperture openings compared with entrance aperture openings in order to reduce cross-talk. The perspective view of FIG. 4 shows the "stick" geometry of the optical filter elements of this one-dimensional filter array. As seen in both FIGS. 3 and 4, the filter elements have slanted sidewalls 140 (labeled only in FIG. 3) corresponding to the slanted sidewalls 40 of the embodiment of FIG. 1. However, as further seen in both FIGS. 3 and 4, the outermost optical filter elements of the filter array (those identified with filter type "1" and "4" in FIGS. 3 and 4) have straight "outer" sidewalls 141 forming the edges of the assembled filter array. This can be advantageous insofar as the assembled filter array has the shape of a right-angled parallelepiped; however, the benefits of slanted sidewalls may be compromised for these outermost filter elements. (It should be noted that the filter array of FIGS. 3 and 4 includes only four filter elements; more typically, the filter array may include dozens or even hundreds of filter elements, and only the outermost filter element on each side has a straight sidewall). An alternative (not shown) is to employ optical filter elements with both sidewalls slanted, and to include additional triangular-shaped fill elements to provide the assembled filter geometry with straight outermost sidewalls.

In the illustrative examples, the filter array is a one-dimensional array, i.e. varying across the paper in the illustrative side view of FIG. 1 and not varying in the transverse direction, i.e. "into the page" in diagrammatic FIG. 1. See also the perspective view of FIG. 4 of the one-dimensional filter array of FIGS. 3 and 4. In such a one-dimensional array, each filter element is elongated to form a filter element "stick", as best seen in FIG. 4.

However, it is also contemplated to have a two-dimensional array of filter elements. For a two-dimensional array, if the angle of incidence θ of the light is only angled respective to one direction of the array, then the filter elements are suitably parallelogram-shaped in that direction, and rectangular in the transverse direction. However, it is also contemplated for the light to be angled in both directions of the ray, e.g. with angle-of-incidence $θ_x$ in the "x-direction" of the two-dimensional array and angle-of-incidence $θ_y$ in the "y-direction" of the two-dimensional array. In this case the filter elements are suitably parallelogram-shaped with sidewalls angled $θ_{x,sub}$ in the "x-direction", and parallelogram-shaped with sidewalls angled $θ_{y,sub}$ in the "y-direction".

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. An apparatus comprising:
an optical filter array comprising a plurality of optical filter elements, each optical filter element having a parallelogram shaped cross-section with parallel top and bottom surfaces and parallel slanted sidewalls, each optical filter element including:
   a substrate having a parallelogram-shaped cross-section with parallel light entrance and light exit surfaces and parallel slanted substrate sidewalls slanted at an angle, wherein the angle is defined as the angle between a slanted substrate sidewall and a line perpendicular to the parallel top and bottom surfaces, and
   an interference filter layers stack comprising alternating layers of two or more materials with different refractive index values disposed on one or both of the light entrance surface of the substrate having a parallelogram-shaped cross-section and the light exit surface of the substrate having a parallelogram-shaped cross-section,
the optical filter elements being bonded together at the parallel slanted sidewalls to form the optical filter array;
an entrance aperture disposed on the parallel light entrance surfaces of the optical filter array and having openings aligned with the light entrance surfaces of the optical filter elements that allows for the passage of light; and
an exit aperture disposed on the parallel light exit surfaces of the optical filter array and having openings aligned with the light exit surfaces of the optical filter elements that allows for the passage of light;
wherein the exit aperture openings are laterally shifted relative to the entrance aperture openings to accommodate the slanted sidewalls of the optical filter elements.

2. The apparatus of claim 1 wherein the slanted sidewalls are slanted at an angle of at least 5°.

3. The apparatus of claim 1 wherein the slanted sidewalls are slanted at an angle of at least 9°.

4. The apparatus of claim 1 wherein the openings of the exit aperture are smaller than the openings of the entrance aperture.

5. The apparatus of claim 1 wherein the openings of the exit aperture are the same size as the openings of the entrance aperture.

6. The apparatus of claim 1 wherein the optical filter elements comprise:
a plurality of optical filter elements of different optical filter types defined by different interference filter layers stacks.

7. The apparatus of claim 1, wherein the interference filter layers stacks of the optical filter elements comprise passband filters or notch filters operating in the visible spectrum.

8. The apparatus of claim 1, wherein the interference filter layers stacks of the optical filter elements comprise passband filters or notch filters operating in the ultraviolet spectrum.

9. The apparatus of claim 1, wherein the interference filter layers stacks of the optical filter elements comprise passband filters or notch filters operating in the infrared spectrum.

10. A method comprising:
providing an optical filter array as set forth in claim 1; and
illuminating the optical filter array with light at an angle-of-incidence θ equal to the angle of the slanted sidewalls.

11. A method comprising:
providing an optical filter array as set forth in claim 1; and
illuminating the optical filter array with light at an angle-of-incidence $θ=n_{sub}θ_{sub}$ where $n_{sub}$ is the refractive index of the parallelogram-shaped substrates and $θ_{sub}$ is the angle of the slanted sidewalls.

12. The apparatus of claim 1 wherein the parallelogram-shaped substrates of the optical filter elements of the optical filter array are transparent over an operational optical range of the optical filter array.

13. The apparatus of claim 1 wherein the interference filter layers stack of each optical filter element is deposited on the parallelogram shaped substrate by sputtering, vacuum evaporation, or plasma deposition.

14. An apparatus comprising:
an optical filter array including:
   a plurality of optical filter elements, each optical filter element including a different interference filter, and each optical filter element having a light entrance surface and a light exit surface connected by slanted sidewalls, wherein the interference filter of each optical filter element is disposed on one or both of the light entrance surface or the light exit surface of the optical filter element; and
   an adhesive disposed between adjacent optical filter elements that bonds the adjacent optical filter elements together at the adjacent slanted sidewalls to form the optical filter array with the light entrance surfaces of the optical filter elements forming a light entrance side of the optical filter array and the light exit surfaces of the optical filter elements forming a light exit side of the optical filter array;
an entrance aperture disposed on the light entrance side of the optical filter array and having openings aligned with the light entrance surfaces of the optical filter elements; and an exit aperture disposed on the light exit side of the optical filter array and having openings aligned with the light exit surfaces of the optical filter elements;

wherein the exit aperture openings are laterally shifted relative to the entrance aperture openings to accommodate the slanted sidewalls of the optical filter elements.

15. The apparatus of claim 14 wherein the optical filter array further includes:

outermost optical filter elements, each outermost optical filter element having a light entrance surface and a light exit surface connected by a slanted sidewall and by a straight sidewall;

wherein the outermost optical filter elements are bonded by the adhesive via the slanted sidewalls of the outermost optical filter elements to ends of the optical filter array with the straight sidewalls of the outermost optical filter elements defining straight outermost sidewalls of the optical filter array.

16. The apparatus of claim 14 wherein the slanted sidewalls are slanted at an angle of at least 5°.

17. The apparatus of claim 14 wherein the slanted sidewalls are slanted at an angle of at least 9°.

18. The apparatus of claim 14, wherein the optical filter elements comprise pass-band filters or notch filters.

19. An apparatus comprising:

an optical filter array comprising optical filter elements, each optical filter element having a parallelogram shaped cross section with parallel top and bottom surfaces and parallel slanted sidewalls, each optical filter element including:

a substrate having a parallelogram-shaped cross-section with parallel light entrance and light exit surfaces and parallel slanted sidewalls slanted at an angle, and an interference filter disposed on one or both of the light entrance surface of the parallelogram-shaped substrate and the light exit surface of the substrate having a parallelogram shaped cross section;

an entrance aperture disposed on the parallel light entrance surfaces of the optical filter array and having openings aligned with the light entrance surfaces of the optical filter elements that allows for the passage of light; and an exit aperture disposed on the parallel light exit surfaces of the optical filter array and having openings aligned with the light exit surfaces of the optical filter elements that allows for the passage of light;

wherein each interference filter is disposed only on a corresponding one substrate having a parallelogram shaped cross section of the optical filter array, and wherein the optical filter elements are bonded together at the parallel slanted sidewalls.

* * * * *